Figure 1:
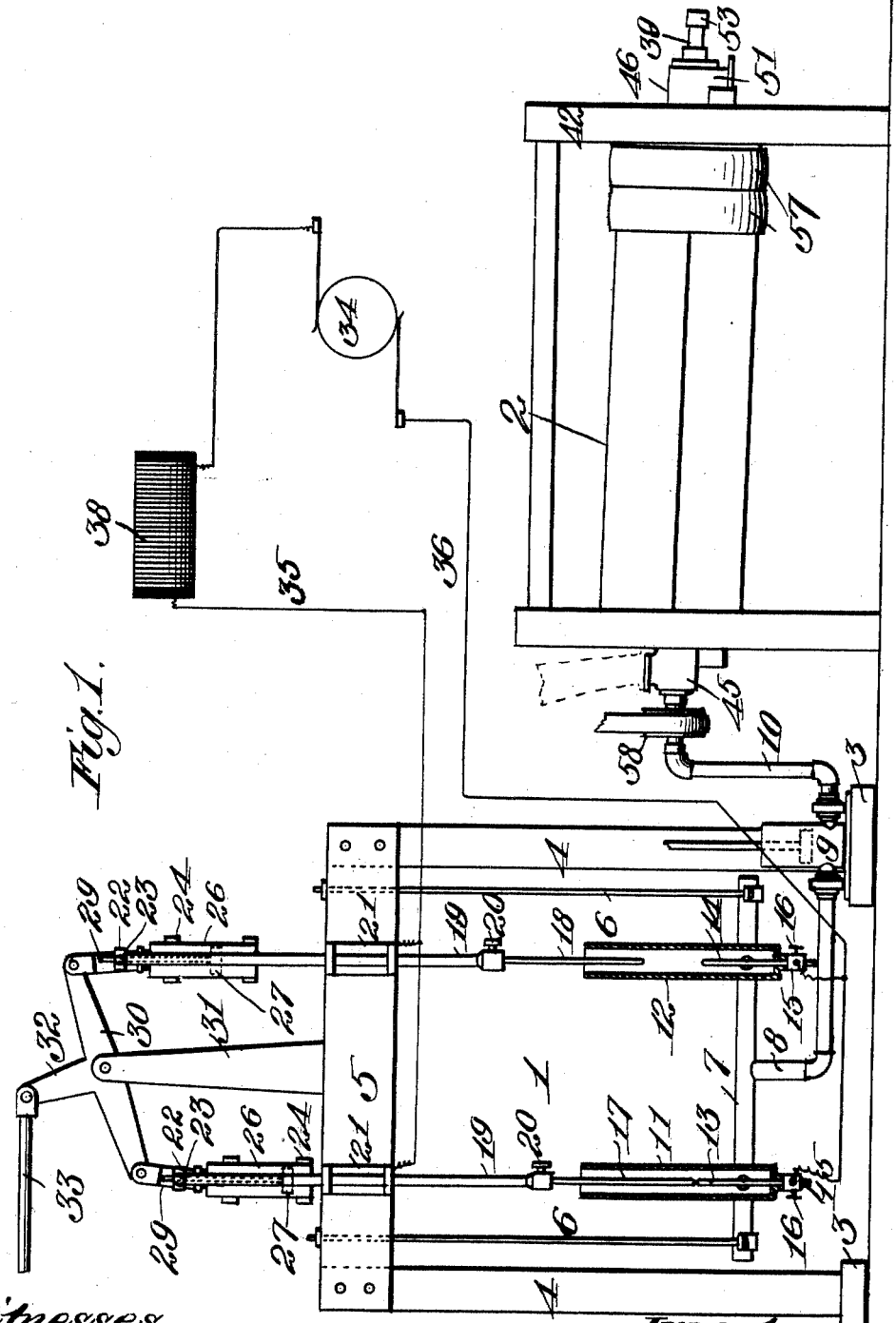

No. 759,651. PATENTED MAY 10, 1904.
J. N. ALSOP.
PROCESS OF TREATING FLOUR.
APPLICATION FILED JUNE 2, 1903.
NO MODEL. 2 SHEETS—SHEET 1.

Witnesses:
Robert Ewitt
James L. Norris, Jr.

Inventor.
James N. Alsop.
By James L. Norris.
Atty.

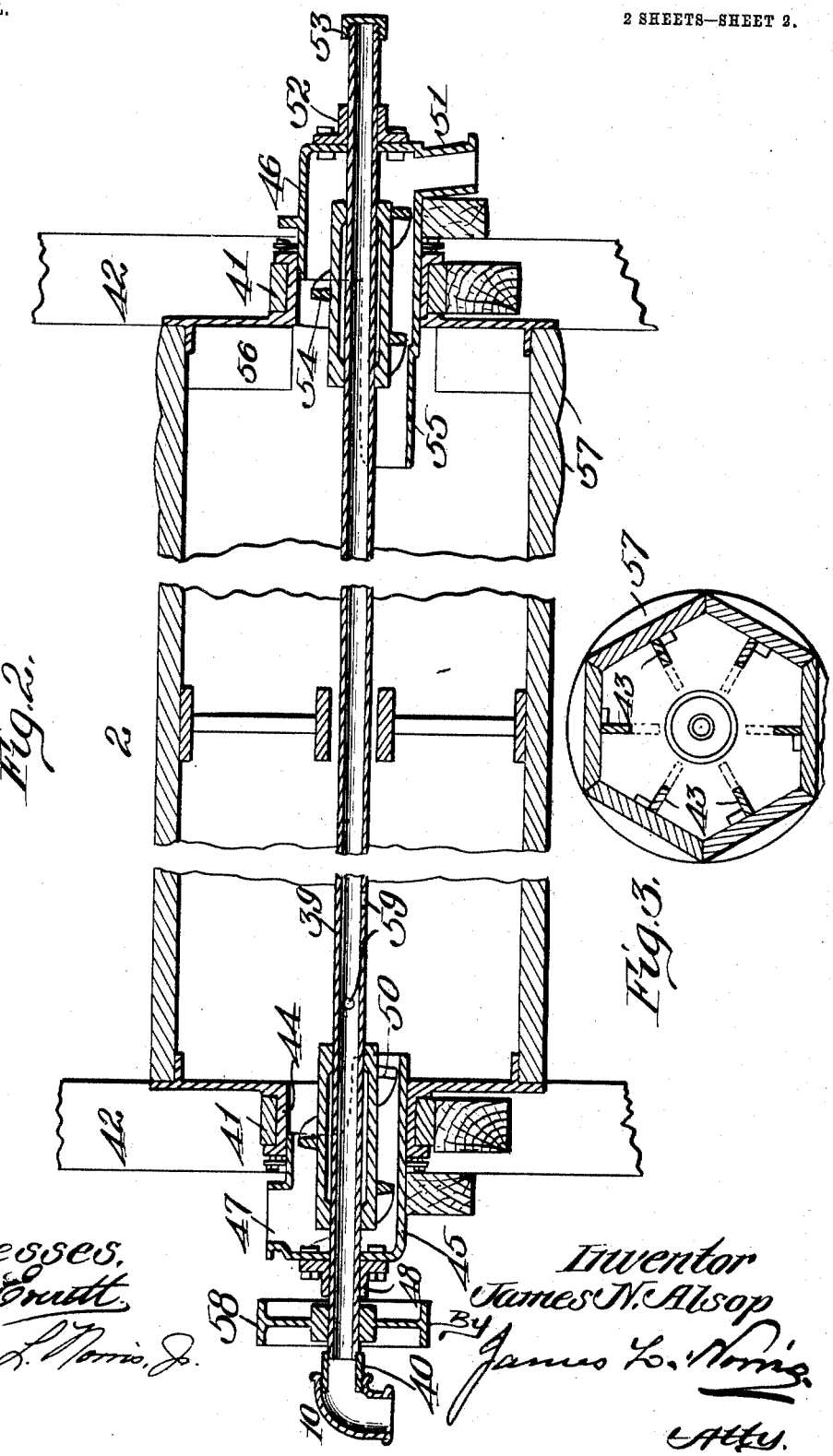

No. 759,651. Patented May 10, 1904.

UNITED STATES PATENT OFFICE.

JAMES N. ALSOP, OF OWENSBORO, KENTUCKY.

PROCESS OF TREATING FLOUR.

SPECIFICATION forming part of Letters Patent No. 759,651, dated May 10, 1904.

Application filed June 2, 1903. Serial No. 159,797. (No specimens.)

*To all whom it may concern:*

Be it known that I, JAMES N. ALSOP, a citizen of the United States, residing at Owensboro, in the county of Davis and State of Kentucky, have invented new and useful Improvements in Processes of Treating Flour, of which the following is a specification.

This invention relates to a novel process of treating flour to purify the same and increase the nutritive qualities thereof, and to this end resides, broadly, in subjecting flour to the action of a gaseous medium which will operate to bleach or purify the flour and cause a reduction of the quantity of the carbohydrate contents and an increase in the quantity of the protein contents thereof. The gaseous medium which I employ is atmospheric air which has been subjected to the action of an arc or flaming discharge of electricity. The resultant gas I have discovered, first by laboratory experimentation and then by actual practice on a commercial scale, to possess the property of causing a material decrease in the percentage of the carbohydrate contents of the flour subjected to its action and a practically corresponding increase in the proteids, thus greatly increasing the nutritive in contradistinction to the heat-giving qualities of the flour. I am not able to identify accurately by chemical formula this gaseous medium. It has been determined by chemical analysis, however, that air treated in the manner hereinafter described contains nitrogen peroxid ($NO_2$ or $N_2O_4$) and traces of ozone ($O_3$) and is in a state of ionization—that is to say, the air is separated into atoms or combinations of atoms, which are electrically charged, some negatively and some positively, and are thus in a condition to enter into new combinations.

In the art of milling it is a desideratum to manufacture flour which shall be white in color, and flour practically white in color has been produced; but so far as I am aware such whitening of the flour has never been effected without destroying to a large extent its nutritive qualities, or except by the use of acids or gases which make the flour subjected to the action thereof objectionable as a food product, owing to the deleterious qualities imparted to the flour by the bleaching agents employed.

I find in the practice of my process that flour subjected to the action of air which has been subjected to the flaming discharge of electricity will be bleached or purified, so as to render it white in color, and this bleaching or purification of flour is effected without destroying any of the nutritive qualities thereof, as shown by chemical analysis. I have also found that when portions of the treated and untreated flours, equal by weight, are blended with equal quantities of distilled water the two doughs thus formed are very different in consistency, that from the treated flour being apparently drier and much more elastic than that from the untreated flour, the dough from the latter being "short" and relatively non-elastic. When equal portions, by weight, of the two flours are blended with water sufficient to make a dough suitable for baking, it is found that the treated flour requires more water—from five to seven per cent. more. I also find that the treated and untreated flours from the same barrel when made into dough and baked will produce loaves of bread which upon being cut or broken show the same difference in color as was shown by the treated and untreated flours, the bread from the treated flour being much whiter.

I am unable to explain fully the reason for the change which is produced in the flour by treating it according to my process; but chemical analyses of the treated flour have demonstrated that it is largely due to the fact that there is a chemical combination of a relatively large amount of nitrogen or nitrogenous compounds with the flour. It is also believed that such chemical combination of the nitrogen with the flour is facilitated by producing a state of ionization of the air, and it is possible that the ionized air itself in some other way acts upon the flour to assist in producing the changes herein indicated. I will give the result of two chemical analyses of the flour, the first made to determine the extent and character of the change wrought in the constitutents of the flour and the second made to determine the amounts of nitrogen which the untreated and treated flour, respectively, contains. Two samples of flour were submitted for analysis to a professor of chemistry in Columbian College, Washington, District of Columbia. One of these samples was taken from a batch of flour before its treatment by my process and the other was taken from the same batch of flour after its treatment by my process. The untreated flour showed the following constituents in the proportions named: water, 9.84; starch, &c., 74.11; proteids, &c., 14.99; ash, 0.44; fat, 0.62. The flour which had been treated by my process showed the constituents in the following proportions: water, 10.13; starch, &c., 62.24; proteids, &c., 26.71; ash, 0.30; fat, 0.62. It will thus be seen that the flour which had been treated showed an increase of 11.72 parts of proteids and a decrease of 0.14 parts of ash and of 11.87 parts of starch. The increase in the proportion of proteids relative to that of the other constituents of the flour, especially of starch and ash, is a highly-advantageous result, as flour having such proportion of proteids is of course far more nutritive than the ordinary flour of commerce. As an incidental result of treating the flour by my process it is, as above stated, highly purified and whitened. The second analysis of the flour was conducted by the Henry professor of physics of Princeton University and his assistant professor, and it was found that while the untreated flour contained fifty-four one-thousandths of a gram of nitrogen per one gram of flour the treated flour contained seventy-five one-thousandths of a gram of nitrogen per one gram of flour.

In order that the invention may be clearly understood, I have illustrated in the accompanying drawings apparatus for carrying out the process.

In said drawings, Figure 1 is a view in elevation of a reel having combined therewith an apparatus for subjecting air to the disruptive discharge of electricity, parts of which latter apparatus are in section. Fig. 2 is a central longitudinal section, on a larger scale, of the reel; and Fig. 3 is a cross-section through the same.

Referring now to the drawings, 1 indicates the apparatus by means of which the air is subjected to the action of the electric arc or flame, and 2 indicates the reel in which the flour is treated by the gaseous medium produced in the apparatus 1. The said apparatus comprises a frame having base-blocks 3, uprights 4, and transverse supporting-beams 5, which latter support in any suitably manner, by means of rods 6, a conduit 7, closed at its end and connected centrally to a pipe 8, which in turn is operatively connected to an air-pump 9, having an eduction-pipe 10. Communicating with and extending upward from the conduit 7 are shown two tubes opened at their upper end, said tubes being indicated, respectively, by the numerals 11 and 12. Extending upward through the lower end of each tube is an electrode, indicated, respectively, by the numerals 13 and 14, said electrodes being adjustably supported in holders 15 by means of set-screws 16. Extending downward through the upper end of each tube is a movable electrode, these electrodes being indicated, respectively, by the numerals 17 and 18. The electrodes 17 and 18 are supported in an automatically-adjustable manner. It may be here stated that the apparatus for subjecting air to the action of a flaming discharge of electricity forms the subject-matter of a separate application, filed May 29, 1903, Serial No. 159,383, and I have only shown the same herein conventionally or in its simplest form in order to illustrate the manner of carrying out the process forming the subject-matter of the present application.

19 indicates movable supports in the lower ends of which electrodes 17 and 18 are secured by means of binding-screws 20. Said supports are slidably mounted in guides 21, secured to the transverse frame members 5, and at their upper ends are adjustably secured in plates 22 by means of the binding-screws 23, said plates being of non-conducting material.

24 indicates a frame or cross-head which is adapted to have a vertical movement, said cross-head or frame 24 carrying at opposite sides cylinders 26, which are adapted to contain oil. Working in each of said cylinders is a piston 27, which is connected by a piston-rod to the plate 22.

29 indicates pitmen which are connected at their lower ends to the respective cross-heads 24 and at their upper ends are connected to opposite ends of the walking-beam 30, which is centrally and pivotally mounted on a support 31, rising from the frame of the machine. The walking-beam 30 is provided with a centrally-projecting arm 32, pivotally secured to which is a rod 33, by means of which the walking-beam is adapted to be rocked back and forth in the usual manner, the rod 33 being reciprocated by any suitable mechanical means—such as a crank, eccentric, or the like—which means need not be particularly referred to. It will be seen that as the walking-beam is operated one of the electrodes—say 17—will be moved downward, while the other, 18, will be moved upward.

The current for producing the arcs between the electrodes is supplied by a dynamo 34, from which lead wires 35 and 36. Beginning with the wire 36 said wire passes to the electrode 14 and then over to the electrode 13. The other wire of the dynamo leads to a coil 38 having high self-induction and then leads from said coil and is electrically connected to the movable electrodes 17 and 18.

The operation of this apparatus is as follows: Assuming the parts to be in the positions shown in Fig. 1, the current is now passing through the electrodes 13 and 17. As the walking-beam 30 is operated to raise the electrode 17 an arc is formed between the electrodes 17 and 13, and the air contained within the tube surrounding these electrodes will be converted into a gaseous medium having the properties indicated. This gaseous medium is withdrawn from the tube by means of the action of the air-pump 9 and is delivered by said air-pump through the eduction-pipe 10 to the reel 2. As the electrode 17 continues to rise the electrode 18 will of course be correspondingly lowered, and the arc between the electrodes 17 and 13 will be maintained until the electrode 18 comes in contact with the electrode 14, when the current will be short-circuited through the latter electrodes and the arc between the electrodes 17 and 13 will be extinguished. The same operation will be repeated as the electrode 18 is raised, the arc being maintained until the electrodes 17 and 13 come in contact, or in the position in which they are shown in the drawings, when the current will be again short-circuited to the tube 11 and the arc between the electrodes 18 and 14 will be extinguished.

In treating air by this apparatus I am enabled to employ a current of very low potential. I have found, however, that with the low-potential current some means must be provided for feeding the arc, or, in other words, to meet the increased resistance offered as the electrodes are moved farther apart. This requirement I meet by the introduction into the circuit of the self-induction coil 38, the action of which is as follows: When either pair of the electrodes is brought together, thereby causing short-circuiting of the electrifying apparatus, the coil 38 is excited to a high degree of magnetism, and as the electrodes are pulled apart and are followed by the arc or flash, which increases the resistance of the circuit, the strength of the magnetism of the coil will be diminished. This change in the strength of the magnetism generates an extra current in the circuit or coil in the same direction as the original current and proportional in strength to the magnetic change, all as is well known. As the electrodes are drawn apart to form arcs the resistance of the circuit is additionally increased, causing the strength of magnetism in the coil to be additionally diminished, thereby causing the potential at the electrodes to rise to the necessary strength to meet the resistance of the air or gas between them, as the distance between the electrodes is increased until the opposite pair of electrodes are brought together and short-circuits said arcs. The contact of the electrodes lasts for an appreciable length of time, and the time during which the electrodes are in actual contact is sufficient to enable the coil 38 to become thoroughly saturated with electricity. As a result when the electrodes are separated to draw off the arc the potential of the current is increased in the manner heretofore explained, and not only so, but the arc is fed with current and prevented from appreciable attenuation and maintained at a practically uniform density, which is the maximum density obtainable at the time. This may be further explained by stating that in practice the arc drawn off rarely exceeds four and one-half inches in length, whereas with a machine operating under the conditions herein described an arc eighteen inches can be drawn off before the arcing distance is passed. Thus it will be seen that I produce an arc, maintain the same at its maximum density and without appreciable attenuation, and short-circuit the arc while in this condition.

The amount of the gaseous medium produced in a given time will be in proportion to the number of amperes of electricity used, the potential at which it is passed through the apparatus, and the amount of air drawn through the tubes by the air-pump.

The eduction-pipe 10 from the pump 9 communicates with the interior of the reel through the medium of a pipe 39, which is journaled in the end of a coupling 40, screwed in the end of the pipe 10. The reel 2 as a whole is mounted at opposite ends in bearings 41, supported in a suitable manner in a frame 42.

In carrying my invention into effect I find it advantageous to subject the flour to the action of the gaseous medium within an airtight inclosure. For this purpose the reel 2, which, as shown, is preferably hexagonal in cross-section, is formed of wood or other suitable material and closed on all sides and at the ends except where the flour enters and leaves. Within the reel I provide a series of longitudinal ribs 43, which extend from end to end of the reel, said ribs projecting inwardly from the inner side of the reel and one of said ribs being provided for each side of the reel. These ribs are for the purpose of elevating the flour as the reel revolves and then discharging the same, so as the flour may be thoroughly brought into contact with the gaseous medium supplied from the apparatus 1. At each end of the reel a central cylindrical extension 44 is provided, which forms the journals of the reel, said extension being mounted in the bearings 41. Journaled within each extension 44 of the reel and suitably supported by the frame is a casing, said casings being denoted, respectively, by the numerals 45 and 46. The casing 45 communicates with the interior of the reel and is provided on its upper side with an opening 47, through which the flour is supplied to the reel. The outer end of the casing 45 is perforated to receive the pipe 39 and has further secured to its end a bearing 48 for said pipe. Mounted on the pipe 39 in any suitable manner is a worm-conveyer 50, the length of which is about equal to that of the casing 45— that is to say, it projects slightly within the reel 2. The casing 46 is provided on its under side with a downward extension 51, which forms a pipe or chute to permit of the discharge of the flour from the reel. The pipe 39 extends throughout the length of the reel and through the outer end of the casing 46, which latter is provided on said outer end with a bearing 52 for the pipe. The outer end of the pipe 39 is closed by a cap 53. The casing 46 communicates with the interior of the reel, and within said casing is provided a worm-conveyer 54, which is mounted in any suitable manner upon the pipe 39. Supported on the inner end of the casing 46 and projecting a considerable distance into the reel 2 is a semicircular trough 55, open on its upper side, and within which trough a portion of the conveyer 54 revolves. At this end of the reel I provide extensions 56 of the ribs 43, said extensions projecting inward to within a short distance of the edge of the worm-conveyer and the purpose of these extensions being to lift the flour as the reel revolves and drop it into the trough 55, whereby the worm-conveyer 54 will draw it through the casing 46 and discharge it through the outlet 51. I also form the discharge end of the reel of a circular shape in cross-section, as indicated by the hatched portion at 57, whereby a belt or belts may be applied to the reel for the purpose of revolving it. At the opposite end of the reel the pipe 39 is provided with a pulley 58, whereby said pipe, with its worm-conveyers 51 and 54, may be revolved. The pipe 39 is provided at suitable intervals in the portion thereof within the reel with apertures 59, which are preferably spirally arranged around the pipe, these apertures being for the purpose of permitting the gaseous medium to be discharged into the interior of the reel.

In operation flour is applied to the reel through the opening 47 and is conveyed by the worm 50 to the interior of the reel, which, as shown, is arranged in an inclined position. At the same time the apparatus 1 is placed in operation and the pump 9 delivers the gaseous medium through the pipes 10 and 39 to the interior of the reel, and as said reel revolves the flour is constantly lifted up by and discharged off of the various ribs 43, whereby it is continuously agitated and brought into intimate contact with the gaseous medium discharged into the interior of the reel through the apertures 59. This continues as the flour passes from the inlet to the discharge end of the reel, and at said discharge end of the reel the extension-ribs 56 lift the flour and discharge it into the trough 55, and the conveyer 54 causes it to be discharged through the spout 51.

While I have described the reel 2 as being air-tight, except for the inlet and discharge openings for the flour, I wish it understood that my process is not limited to treating flour in a closed or air-tight chamber or reel, but I may treat the flour according to my process in a reel provided with the ordinary bolting cloths or screens—that is to say, having sides of foraminous material.

In actual practice a large number of barrels of flour per day may be treated according to my process, and, in fact, the output of flour treated by my process is substantially only limited by the capacity of the mill, as my process does not to any material extent delay the output, the flour being passed continuously through the reel 2.

In practice I find that with the quantity of air drawn through the apparatus 1 being constant I can increase the effective working qualities of the gaseous medium by an increase in the amperage of the current. With a constant potential of five hundred volts I have used a current of from seven to ten amperes. The amperage of the current is of course regulated by increasing or decreasing the resistance of the induction-coil or by increasing or decreasing the voltage of the dynamo operating.

I have indicated the advantages derived from the use of my process, and it only remains to emphasize the fact that the flour treated by my process is improved in the particulars noted without having any of its qualities as a food product impaired; but, on the contrary, the result of the process is to greatly increase the value of the flour as a food product.

I have herein described my process as applied to the treatment of flour. I wish it understood, however, that said process may be applied to the treatment of the ground product of cereals other than wheat, and the term "flour" used in the claims is intended to have such generic application.

Having thus fully described my invention, what I claim as new is—

1. The process which consists in treating flour with a body of air as modified by the flaming electric discharge.

2. The process which consists in agitating flour and simultaneously treating the same with a body of air as modified by the flaming electric discharge.

3. The process of treating flour which consists in subjecting the same to the action of air which in turn has been subjected to the action of an intermittently-drawn-out electric arc.

4. The process of treating flour which consists in subjecting the same to the action of air which in turn has been subjected to the action of an electric discharge capable of ionizing the air and producing nitrogen-oxygen combinations therefrom.

5. The process of treating flour, which consists in subjecting air to contact with an interrupted flaming electric arc of high-current density and introducing air thus modified into the presence of the flour, for the purpose described.

6. The process of treating flour which consists in subjecting air to the action of an electric arc adapted to produce nitrogen-oxygen combinations therefrom and introducing the air thus modified into the presence of the flour in quantities sufficient to convert part of the starch thereof into proteids.

7. The process of treating flour which consists in subjecting air to the action of an electric arc adapted to ionize the air and produce nitrogen-oxygen combinations therefrom and introducing the air thus modified into the presence of the flour in quantities sufficient to convert part of the starch thereof into proteids.

8. The herein-described process which consists in subjecting a body of air to the action of the flaming discharge of electricity, withdrawing the gaseous medium produced and introducing it in its electrified condition into the presence of flour for the purpose described.

9. The process of treating flour which consists in subjecting the same to the action of air in a state of ionization.

10. The process of treating flour which consists in subjecting the same to the action of nitrogen modified by the electric discharge in air.

11. The process of treating flour which consists in subjecting the same to the action of ionized nitrogen.

12. The process of treating flour which consists in subjecting the same to the action of air which in turn has been so modified by electrical action that it is capable of increasing the nitrogen contents of flour.

13. The process which consists in effecting chemical changes in the composition of flour by the action of a gas or gases in a condition of ionization.

14. The process which consists in effecting chemical changes in the composition of flour by the action of a gas or gases in a condition of ionization produced by the electric discharge in air.

In testimony whereof I have hereunto set my hand in presence of two subscribing witnesses.

JAMES N. ALSOP.

Witnesses:
F. B. KEEFER,
GEO. W. REA.